(12) United States Patent
Pawellek et al.

(10) Patent No.: US 11,415,168 B2
(45) Date of Patent: Aug. 16, 2022

(54) SLIDING-CONTACT BEARING WITH A SEALING ARRANGEMENT, AND WATER PUMP WITH SAME

(71) Applicant: NIDEC GPM GmbH, Auengrund ot Merbelsrod (DE)

(72) Inventors: Franz Pawellek, Lautertal (DE); Marcel Berner, Hildburghausen (DE)

(73) Assignee: NIDEC GPM GmbH, Auengrund ot Merbelsrod (DE)

( * ) Notice: Subject to any disclaimer, the term of this patent is extended or adjusted under 35 U.S.C. 154(b) by 71 days.

(21) Appl. No.: 17/271,691

(22) PCT Filed: Sep. 16, 2019

(86) PCT No.: PCT/EP2019/074681
§ 371 (c)(1),
(2) Date: Feb. 26, 2021

(87) PCT Pub. No.: WO2020/064396
PCT Pub. Date: Apr. 2, 2020

(65) Prior Publication Data
US 2021/0190135 A1    Jun. 24, 2021

(30) Foreign Application Priority Data

Sep. 27, 2018   (DE) .......................... 102018123901.7

(51) Int. Cl.
*F16C 17/02* (2006.01)
*F16C 33/10* (2006.01)
(Continued)

(52) U.S. Cl.
CPC ............ *F16C 17/02* (2013.01); *F04D 29/061* (2013.01); *F16C 33/104* (2013.01);
(Continued)

(58) Field of Classification Search
CPC ........ F16C 17/02; F16C 33/74; F16C 33/743; F16C 33/104; F16C 33/128;
(Continued)

(56) References Cited

U.S. PATENT DOCUMENTS 2,692,559 A   10/1954 Rogers
3,255,510 A   6/1966 Josephson et al.
(Continued)

FOREIGN PATENT DOCUMENTS

CN   1697936 A    11/2005
CN   203879929 U  10/2014
(Continued)

OTHER PUBLICATIONS

International Search Report and Written Opinion dated Dec. 6, 2019 for corresponding International Application No. PCT/EP201 9/074681 filed Sep. 16, 2019 (14 pages) with WIPO machine translation (8 pages).
(Continued)

*Primary Examiner* — Phillip A Johnson
(74) *Attorney, Agent, or Firm* — Daniel F. Nesbitt; Nesbitt IP LLC

(57) ABSTRACT

A sliding bearing having a sealing arrangement for water pumps, configured to radially mount and seal a shaft in a housing between a wet side and a dry side. The sliding bearing and the sealing arrangement include a sliding bearing bushing made of a sintering material for radial mounting of the shaft, and a dry-side shaft seal arranged between the sliding bearing bushing and the dry side. A wet-side shaft seal is arranged between the wet side and the sliding bearing bushing and a lubricant reservoir with a substrate, made of a non-sintered material, which is porous in at least some sections, is arranged at least between the wet-side shaft seal and the sliding bearing bushing. The lubricant reservoir (Continued)

includes, in pores of the substrate, a lubricant insoluble in water. A volume of the lubricant reservoir and a volume of a lubricant filling take up a total volume of spaces between the wet-side shaft seal and the dry-side shaft seal.

20 Claims, 2 Drawing Sheets

(51) Int. Cl.
  *F16C 33/12* (2006.01)
  *F04D 29/06* (2006.01)
  *F16C 33/74* (2006.01)
(52) U.S. Cl.
  CPC ............ *F16C 33/128* (2013.01); *F16C 33/74* (2013.01); *F16C 2208/32* (2013.01); *F16C 2220/20* (2013.01)
(58) Field of Classification Search
  CPC .............. F16C 2208/32; F16C 2220/20; F16C 2360/44; F16C 2360/45; F04D 29/046; F04D 29/056; F04D 29/061
  See application file for complete search history.

(56) References Cited

U.S. PATENT DOCUMENTS

| | | | |
|---|---|---|---|
| 3,387,153 A | | 6/1968 | Grad |
| 3,592,517 A | * | 7/1971 | Harris .................... F16C 33/08 384/215 |
| 3,749,954 A | * | 7/1973 | Anderson, Jr. ...... H02K 5/1677 310/90 |
| 3,763,386 A | * | 10/1973 | Anderson, Jr. ...... H02K 5/1677 310/90 |
| 6,246,136 B1 | | 6/2001 | Ichiyama |
| 2005/0163404 A1 | | 7/2005 | Shishido et al. |
| 2005/0269885 A1 | | 12/2005 | Knox et al. |
| 2010/0220943 A1 | | 9/2010 | Mikami et al. |
| 2012/0328461 A1 | * | 12/2012 | Lebkuchner .......... F16C 33/128 384/279 |
| 2014/0023529 A1 | * | 1/2014 | Lebkuchner .......... F04D 29/061 417/366 |
| 2021/0079920 A1 | | 3/2021 | Pawellek |

FOREIGN PATENT DOCUMENTS

| | | |
|---|---|---|
| DE | 3616844 A1 | 11/1987 |
| DE | 19639928 A1 | 4/1997 |
| DE | 102004062842 B3 | 4/2006 |
| DE | 102018104015 A1 | 8/2019 |
| GB | 1059440 A | 2/1967 |
| JP | 2006177459 A | 7/2006 |

OTHER PUBLICATIONS

First Office Action dated Aug. 20, 2019 in related German Application No. 10 2018 123 901.7 filed Sep. 27, 2018 (5 pages) with Google machine translation (2 pages).

International Preliminary Report on Patentability (Chapter I) dated Mar. 23, 2021 for corresponding International Application No. PCT/EP201 9/074681 filed Sep. 16, 2019 (10 pages) with WIPO translation (8 pages).

First Office Action and Search Report dated Mar. 1, 2022 in copending CN Application No. 201980061997.2 filed Mar. 22, 2021 (9 pages) with CNIPA machine translation (9 pages).

* cited by examiner

SLIDING-CONTACT BEARING WITH A SEALING ARRANGEMENT, AND WATER PUMP WITH SAME

CROSS-REFERENCE TO RELATED APPLICATIONS

The present application is a National Stage Entry of International Application Number PCT/EP2019/074681, filed Sep. 16, 2019, which claims the benefit of German Application Number DE102018123901.7, filed Sep. 27, 2018, the disclosures of which are hereby incorporated by reference in their entireties.

FIELD OF THE INVENTION

The present invention relates to a radial sliding bearing having a sealing arrangement for water pumps, and to a water pump for a coolant circuit in a vehicle which comprises the radial sliding bearing having the sealing arrangement.

BACKGROUND OF THE INVENTION

Water pump bearings having rolling elements are known in the prior art. In general, they are sensitive to the ingress of moisture because the materials used, in particular suitable steels of rolling elements, are not sufficiently corrosion-resistant for use in moisture. Small leakages always occur at bearing seals. Ingress of moisture leads, by reason of corrosion, to the reduction in the surface quality of the rolling elements and races, which results in greater friction in the bearing and corresponding heat development and further subsequent damage on bearings and seals. Therefore, a shaft bearing or its sealing often constitutes the limiting factor for the service life of a pump because they are subject, per se, to frictional wear and embrittlement as a result of pressure and temperature fluctuations.

Water pumps are known having a sliding bearing which is lubricated by a conveyed coolant. These water pumps are driven mechanically or by means of a wet-running electric motor.

Patent application DE 196 39 928 A1 discloses a water pump which is driven mechanically by means of a belt and in which a shaft connected to a pump impeller is mounted by means of a sintered sliding bearing. The bearing gap is lubricated by the medium to be conveyed.

Leakages at shaft seals are also a problem on sliding bearings, in particular if a moisture-sensitive assembly, such as an electric motor, is arranged downstream of the shaft bearing.

Electric water pumps having a wet runner have a lower level of efficiency because the gap between the stator and the rotor for accommodating a can turns out to be larger and a field strength acting upon the rotor is consequently attenuated. Moreover, liquid friction occurs on the rotor, whereby the level of efficiency decreases further specifically in the case of the relatively small-dimensioned pump drives of auxiliary water pumps. Furthermore, wet runners encounter problems at low temperatures, such as icing in the gap between the stator and the rotor.

A patent application DE 10 2018 104 015.6 which is by the same applicant but was not yet published on the application date of this patent application relates to the bearing and sealing of a water pump having a dry-running electric motor by means of a coolant-lubricated sintered bearing. The concept of this bearing and sealing provides measures to discharge an unavoidable slight leakage of coolant in order to protect the electric motor and control electronics from being damaged by the ingress of wetness. More precisely, a non-critical moisture balance under the operating conditions is achieved, in which the guiding away of the leakage droplets by means of rotation and waste heat of the motor results in evaporation which escapes to the atmosphere via a membrane.

It is known that the service life of radial shaft seals depends greatly upon the lubricating conditions at the sealing lip. Sealing lips which run with coolant lubrication have a shorter service life than sealing lips in the environment of a lubricating oil-carrying system by reason of the coefficient of friction of the lubricating film and a phenomenon explained hereinafter. For instance, the formation of deposits under the dynamic sealing surface of the sealing lip which adversely affects the sealing function is observed. This is caused by coolant leakages which vaporise upon passing through the sealing point and leave behind crystalline components of the coolant which form a deposit on the shaft.

SUMMARY OF THE INVENTION

In view of the set forth developments and knowledge in the prior art, an object of the invention is to provide a radial sliding bearing having an integrated sealing arrangement and permitting a durable seal in a water pump.

The object is achieved by a sliding bearing having a sealing arrangement according to the features of claim 1.

The inventive sliding bearing having a sealing arrangement is characterised in particular in that a wet-side shaft seal is arranged between the wet side and the sliding bearing bushing; and a lubricant reservoir with a substrate, made of a non-sintered material, which is porous in at least some sections, is arranged at least between the wet-side shaft seal and the sliding bearing bushing; wherein the lubricant reservoir includes, in pores of the substrate, a lubricant insoluble in water, and a volume of the lubricant reservoir and a volume of a lubricant filling take up a total volume of spaces between the wet-side shaft seal and the dry-side shaft seal.

Therefore, the invention provides for the first time a sliding bearing for water pumps which carries a separate lubricant with respect to an environment of a medium to be conveyed.

The invention likewise provides for the first time the use of a lubricant reservoir which is partly solid and partly viscous in structure and which serves not only to lubricate the bearing but also provides, by reason of its arrangement, a long-lasting sealing function which is advantageous in the operating environment of a water pump, as explained later.

In its most general form, the invention is based upon the knowledge of using a lubricant reservoir in a sliding bearing which produces a locally bound viscous cushion with respect to a surrounding medium and in so doing contributes differently directed effects to a sealing function in the sliding bearing.

During the operation of a water pump, a pressure equilibrium is achieved between an increasing delivery pressure in the pump chamber and the lubricant reservoir in the sliding bearing, whilst any washing out of the water-insoluble lubricant from the pores of the substrate is prevented. In the event of an increasing outer pressure of the medium to be conveyed in the direction of the sliding bearing bushing, a sponge-like morphology of the lubricant reservoir ensures that any expansion of the lubricant reservoir in a radial direction component increases a separating effect with respect to a lubricant filling located downstream thereof. A displacement or compression of the lubricant reservoir produces in an axial direction component an increased contact pressure on the shaft seal to the dry side, wherein a lubricant filling downstream of the lubricant reservoir transfers the contact force to the corresponding sealing lip and lubricates it at the same time.

The inventive concept of the sliding bearing having the sealing arrangement provides several advantages in a water pump.

The shaft seal to the wet side is arranged adjacent or in contact with the lubricant reservoir and is supplied with lubricant. A dynamic sealing surface of the corresponding sealing lip is always wetted with a lubricating film and the formation of deposits by coolant residues is suppressed. Likewise, the opposite shaft seal to the dry side is supplied from a lubricant filling and so the corresponding sealing lip having a lubricating film slides on the shaft. The shaft seals lubricated with lubricant achieve a considerably longer service life in comparison with coolant-lubricated shaft seals.

The porous structure of the substrate and water-insolubility of the lubricant effect local binding of the lubricant. Any washing-out of the sliding bearing is prevented by the ingress of a medium to be conveyed during the pressure equalisation in operation and low friction and low wear of the sintered sliding bearing are ensured.

The sealing arrangement takes up a small amount of installation space within the structure of the sliding bearing and at the same time provides lubrication for the duration of the service life. Consequently, the sliding bearing having the sealing arrangement is suitable for use as a compact bearing, i.e. as a single unit for the mounting and sealing of a pump shaft.

The cooperation of the lubricant filling and the substrate of the lubricant reservoir, which is saturated with lubricant, and the shaft seals improves a sealing effect against axial penetration of the sliding bearing. Therefore, the sliding bearing having a sealing arrangement is suitable for applications with moisture-sensitive assemblies, such as in particular an electric motor of the dry runner type or electronics.

In conventional designs of water pumps having improved sealing for dry-running electric motors, a leakage container and an evaporation bore for capturing leakage droplets from the pump chamber are provided upstream of the electric motor. In comparison with such designs, in spite of reliable sealing, a design of the housing can be simplified, installation space and material costs can be saved and more compact overall dimensions can be achieved. Moreover, labyrinth seals or similarly structured seals can be replaced by more favourable shaft seals having a comparatively simply configured sealing lip.

The reliable sealing of the sliding bearing permits the use of electric pump drives, in particular a dry runner which has a higher level of efficiency by reason of a smaller air gap between the rotor and stator. Dry runners are also more cost-effective in comparison with wet runners because they can be purchased as a separate unit having standardised components, i.e. independently of a type-specific geometry of a pump.

Advantageous developments of the inventive sliding bearing having a sealing arrangement are the subject matter of the dependent claims.

According to one aspect of the invention, the volume of the substrate can be entirely formed of a structure with open pores, and the open pores can be saturated with the lubricant. This optimises a sponge-like morphology of the lubricant reservoir.

According to one aspect of the invention, the substrate can be made of a polymer matrix with a defined porosity. By means of the polymer matrix, a porous substrate can be produced which provides optimised properties in relation to a suitable pore size and a suitable elasticity for the lubricant reservoir.

According to one aspect of the invention, the lubricant can be a synthetic oil. As a result, it is possible to provide an application-optimised viscosity of the lubricant filling in relation to the lubricating, sealing and leakage properties.

According to one aspect of the invention, the sintering material of the sliding bearing bushing can have a defined porosity. This makes it additionally possible to uniformly impregnate or saturate the sintering material with the lubricant. In comparison with dry-running sintering materials which contain particles of solid-state lubricants or variants of coolant-lubricated sintered sliding bearings, lower coefficients of friction and a longer service life are achieved when using sintered sliding bearings with viscous lubrication.

According to one aspect of the invention, in the sliding bearing bushing at least one recess can be formed that extends through an axial dimension of the sliding bearing bushing, and the lubricant reservoir and the lubricant filling take up a volume of the at least one recess. Axial extensions of the lubricant reservoir to the opposite side of the sliding bearing bushing provide in particular two advantages. On the one hand, a volume and a contact surface between the lubricant reservoir and the sliding bearing bushing can be increased for the purpose of lubricating or saturating the sintering material with the lubricant. On the other hand, the total volume of the lubricant with which the sliding bearing is filled once is increased, as a result of which a further increase in the service life is to be expected.

According to one aspect of the invention, a plurality of axial recesses can be formed in an outer circumference of the sliding bearing bushing. This embodiment constitutes production-optimised, simple shaping for producing the recesses.

According to one aspect of the invention, the porous substrate of the lubricant reservoir can extend through the at least one recess and can be in contact with the dry-side shaft seal. Therefore, lubrication of the shaft seal on the dry side is provided by means of contact with the lubricant reservoir instead of exclusively by means of a lubricant filling. As a result, sealing properties in relation to penetrating dirt particles to the inner side of the sealing lip and leakage of the lubricant to the outer side of the sealing lip can be further optimised.

According to one aspect of the invention, a sealing lip of the dry-side shaft seal can be inclined towards the sliding bearing bushing. As a result, the sealing lip is pressed onto the shaft circumference.

According to one aspect of the invention, the dry-side shaft seal can be made of a fluororubber including vinylidene (di)fluoride. By selecting a fluororubber comprising vinylidene (di)fluoride or FKM for short, application-optimised properties of the friction and service life of a sealing lip on the shaft circumference on the dry side are achieved.

According to one aspect of the invention, the wet-side shaft seal can be made of polytetrafluorethylene. By selecting polytetrafluorethylene or PTFE for short, application-optimised properties of the friction and service life of a sealing lip on the shaft circumference on the wet side are achieved.

According to one aspect of the invention, a radial sliding bearing gap is set to 3 to 10 μm. By virtue of this range of the gap dimension, application-optimised properties of the friction and service life of the sintered body of the sliding bearing bushing are achieved in conjunction with the lubricant.

According to one aspect of the invention, the sliding bearing bushing, the shaft seals and the lubricant reservoir can be accommodated inside a cylindrical bearing housing. This permits dimensionally stable and flush mounting of the sealing arrangement with respect to the sliding bearing independently of a type-specific geometry of a pump housing, as well as provision as a unit or assembly.

According to one aspect of the invention, a water pump for a coolant circuit in a vehicle is provided, wherein the sliding bearing having the sealing arrangement is arranged inside a pump housing between a pump chamber, in which a pump shaft is connected with a pump impeller, and a drive side of the pump housing, on which the pump shaft is driven. The use as a single compact bearing for a shaft in a pump which is optimised in relation to installation space constitutes a preferred product which is worthy of protection and comprises the sealing bearing having a sealing arrangement.

According to one aspect of the invention, a corresponding electric water pump is provided which comprises an electric motor of the dry-runner type which is connected to the pump shaft. This pump type constitutes a preferred product worthy of protection for using the sealing function of the sliding bearing having a sealing arrangement.

According to one aspect of the invention, the pump housing can comprise a thrust surface that is opposite to an end of the pump shaft to the axial sliding bearing. This provides a simple and cost-effective configuration for absorbing axial forces of the pump shaft.

BRIEF DESCRIPTION OF THE FIGURES

The invention will be described hereinafter with the aid of two exemplified embodiments and an example of use in a water pump with reference to the Figures. In the Figures.

A first embodiment of the sealed sliding bearing will be described hereinafter.

DETAILED DESCRIPTION OF THE INVENTION

Figure 1:
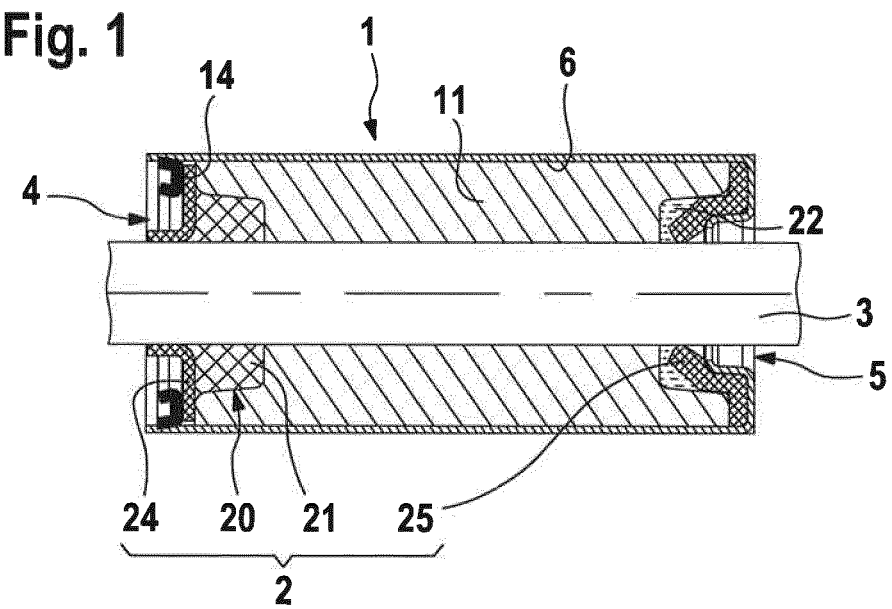
FIG. 1 shows an exposed longitudinal sectional view of the sliding bearing having the sealing arrangement according to a first embodiment.

FIG. 1 shows a sliding bearing 1 in the form of a radial sintered sliding bearing. A sliding bearing bushing 11 which is made from a sintering material, in particular a porous sintered metal alloy, provides, on an inner peripheral surface, a radial sliding bearing surface for the circumference of a shaft 3. The shaft 3 is accommodated in a rotatable and axially displaceable manner in the sliding bearing bushing 11 through a radial bearing gap of about 3 to 10 μm. Furthermore, a sliding property between the shaft 3 and the porous sintering material is assisted by means of a lubricant of a lubricant filling 22 of the sliding bearing 1. The sliding bearing bushing 11 and the lubricant filling 22 are received together with a sealing arrangement 2 in a cylindrical bearing shell 6. The cylindrical bearing shell 6 has, on the side illustrated on the right, a stepped base with a through-opening for the shaft 3.

The sealed sliding bearing 1 is designed to seal the shaft 3 to be mounted between a wet side 4, which is in contact with a liquid medium, and a dry side 5, such as e.g. a cavity or an outer side, such that the liquid medium does not pass axially through the sliding bearing 1 even when there is a pressure difference between the two sides 4 and 5. For this purpose, the sliding bearing 1 is equipped with a sealing arrangement 2. The sealing arrangement 2 of the sliding bearing 1 comprises a wet-side shaft seal 24, a dry-side shaft seal 25 and a sealingly effective lubricant reservoir 20.

The dry-side shaft seal 25 is a radial shaft sealing ring having a dynamic sealing surface with respect to the shaft 3 and closes off an opening gap between the shaft 3 and the through-opening in the stepped base of the bearing shell 6. A sealing lip of the shaft seal 25 is inclined between an offset edge and the shaft circumference inwards into a space which is received in an end side of the sliding bearing bushing 11. The space is taken up by a lubricant filling 22 between the sliding bearing bushing 11 and the shaft seal 25. The wet-side shaft seal 24 is a radial shaft sealing ring having a dynamic sealing surface with respect to the shaft 3 and closes off a radial opening between the shaft 3 and a periphery of the bearing shell 6. The shaft seal 24 is held against an end side of the sliding bearing bushing 11 by means of a clamping ring 14. A sealing lip of the shaft seal 24 has a flange on the shaft circumference which faces outwards to the wet side 4. The shaft seal 24 consists of PTFE and the shaft seal 25 consists of FKM.

A lubricant reservoir 20 is located in a space, which is received in an end side of the sliding bearing bushing 11, between the wet-side shaft seal 24 and the sliding bearing bushing 11. In the Figures, the lubricant reservoir 20 is illustrated by checked hatching. In a delimiting definition with respect to the remaining volume of the lubricant filling 22, the lubricant reservoir 20 is composed of a porous substrate 21 as a basic structure for local binding of the lubricant, and of a volume of the lubricant which is bound in the porous substrate 21. The substrate 21 is circumferentially in radial contact with the shaft 3 and an outer boundary surface of the space or the bearing housing 6. The lubricant reservoir 20 has a sponge-like morphology and is in liquid communication, at least via the bearing gap, with the lubricant filling 22, illustrated by the broken line, which is a liquid cushion of the same lubricant without the porous substrate 21.

The lubricant reservoir 20 is a hybrid lubricant, the principle of which is defined as "solid oil". The porous substrate 21 consists of an elastically flexible polymer matrix, preferably of a so-called Mikrozella having an open pore structure with a capillary action. The lubricant which is absorbed in the pores of the substrate 21 of the lubricant reservoir 20 or is released in over-saturation and which also forms the lubricant filling 22 is a lubricating oil consisting of synthetic hydrocarbons, a silicone oil, an ester oil or the like, of which the viscosity is adjusted to a porosity of the substrate 21 and of the sintering material of the sliding bearing bushing 11 and a loading of the sliding bearing 1.

The sealing function of the sealing arrangement 2 occurs when the lubricant reservoir 20 interacts with the shaft seals 24 and 25 under an externally acting pressure of a liquid medium on the wet side 4. As a consequence, a small leakage of the medium occurs under the sealing lip of the shaft seal 24 into the sliding bearing 1 until pressure equalisation is established. The rising pressure from a side of the lubricant reservoir 20 illustrated on the left effects axial compression and radial expansion of the porous substrate 21. Therefore, radial pressing of the sponge-like lubricant reservoir 20 against the shaft 3 and the bearing shell 6 is increased. A water-insoluble property of the bound lubricant in the porous substrate 21 ensures media separation between the medium which has penetrated and the portion of the sliding bearing 1 located downstream thereof such that any washing out of the lubricant filling 22 is prevented. Moreover, an axial contact pressure on the inwardly inclined sealing lip of the dry-side shaft seal 25 is increased by means of the lubricant filling 22. Since the sealing lip is lubricated by means of the lubricant, an increased surface pressure in relation to the frictional wear is non-critical.

An example of use of a water pump 10 in which the sealed sliding bearing 1 is used is described hereinafter.

Figure 2:
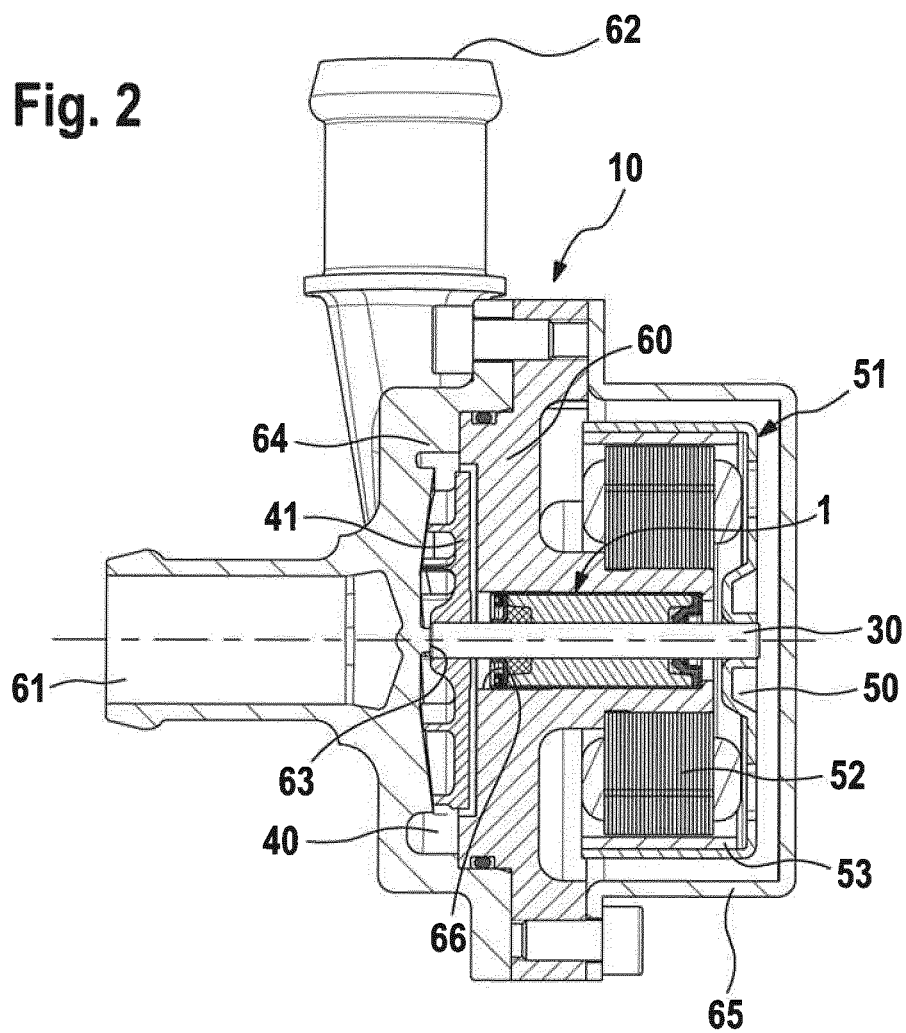
FIG. 2 shows a longitudinal sectional view of a water pump with the sliding bearing having the sealing arrangement according to the first embodiment.

As can be seen in the longitudinal sectional view of a water pump 10 in FIG. 2, a pump housing 60 comprises, on a side illustrated on the left, an intake connection 61 and a pressure connection 62 which issue into a pump chamber 40. The intake connection 61 serves as a pump inlet and it is fitted in the form of a housing cover at an open axial end of the pump chamber 40 onto the pump housing 60. The intake connection 61 leads to a pump impeller 41 which is fixed on a pump shaft 30. The circumference of the pump chamber 40 is surrounded by a spiral housing 64. The spiral housing 64 runs tangentially over into the pressure connection 62 which forms a pump outlet. The pump impeller 41 is a known radial pump impeller having a central opening. The flow to be conveyed which flows towards the pump impeller 41 through the intake connection 61 is accelerated by blades of the pump impeller 41 radially outwards into the spiral housing 64 of the pump chamber 40 and is diverted through the pressure connection 62.

A drive side 50 of the pump housing 60 is located on a side illustrated on the right. The drive side 50 is formed as a receiving chamber of an electric motor 51 in the pump housing 60 and is separated from the pump chamber 40. An axially open end of the drive side 50, formed as a receiving chamber, of the pump housing 60 is closed off by means of a motor cover 65. The electric motor 51 is an outer runner. A rotor 53 is bell-shaped and is connected to the free end of the pump shaft 30 illustrated on the right. The rotor 53 revolves around an inner stator 52 which is arranged on the pump housing 60 in a coaxial manner with respect to the sliding bearing 1. The electric motor 51 is a dry-runner type, i.e. the field coils of the stator 52 are exposed to an air gap opposite the rotor 53.

The pump shaft 30 extends between the pump chamber 40 and the drive side 50, formed as a receiving chamber, through the pump housing 60. In a portion of the pump housing 60, which separates the drive side 50 from the pump chamber 40, a flange-shaped bearing seat 66 for receiving the sealed sliding bearing 1 is formed. The cylindrical bearing housing 6 of the sealed sliding bearing 1 is inserted from the side of the pump chamber 40 to a step portion at the end of the flange-shaped bearing seat 66 and is fixed by means of a press-fit. An end face of the free end of the pump shaft 30 illustrated on the left is opposite a thrust surface 63 of the pump housing 60. The thrust surface 63 is arranged in a strut between the intake connection 61 and the pump impeller 41 and is used for the axial sliding bearing of the pump shaft 30. During operation, the pump impeller 41 pushes the shaft 30 in the direction of the intake connection 61 against the thrust surface 63 and so one-side axial load absorption for the bearing of the pump shaft 30 is sufficient. An exposed sliding surface pairing between the thrust surface 63 and the end side of the pump shaft 30 is lubricated by means a sliding film of the medium to be conveyed, such as e.g. cooling water.

Figure 3:
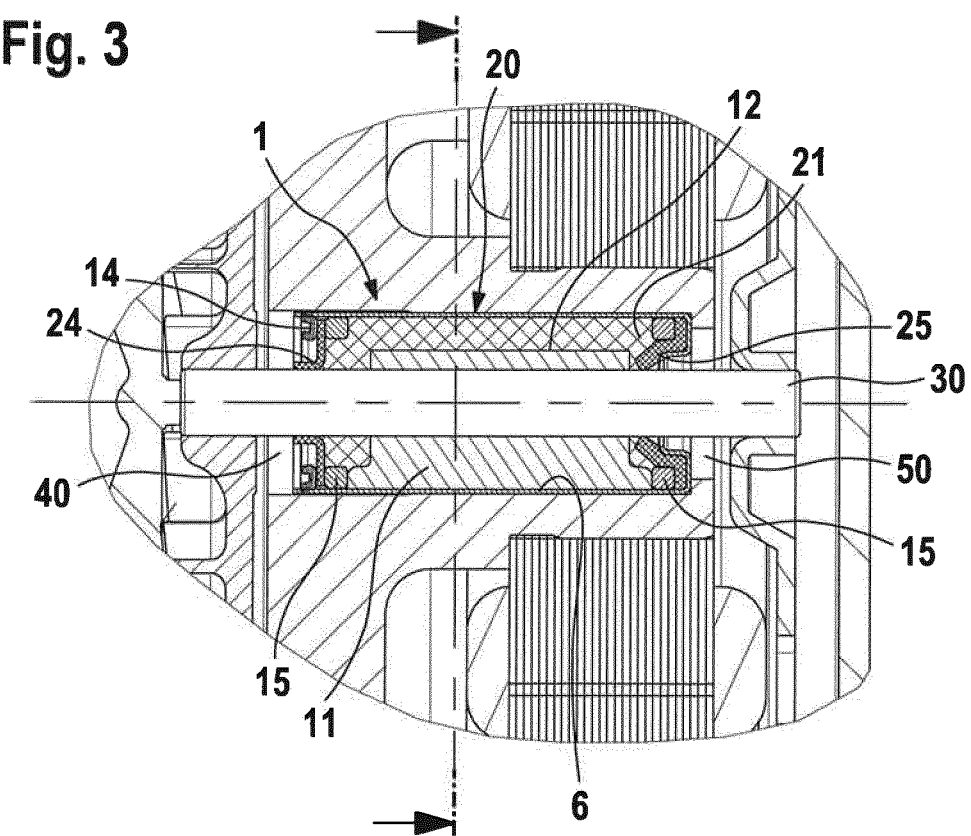
FIG. 3 shows a region of a longitudinal sectional view of a sliding bearing having the sealing arrangement according to a second embodiment in the water pump.
Figure 4:
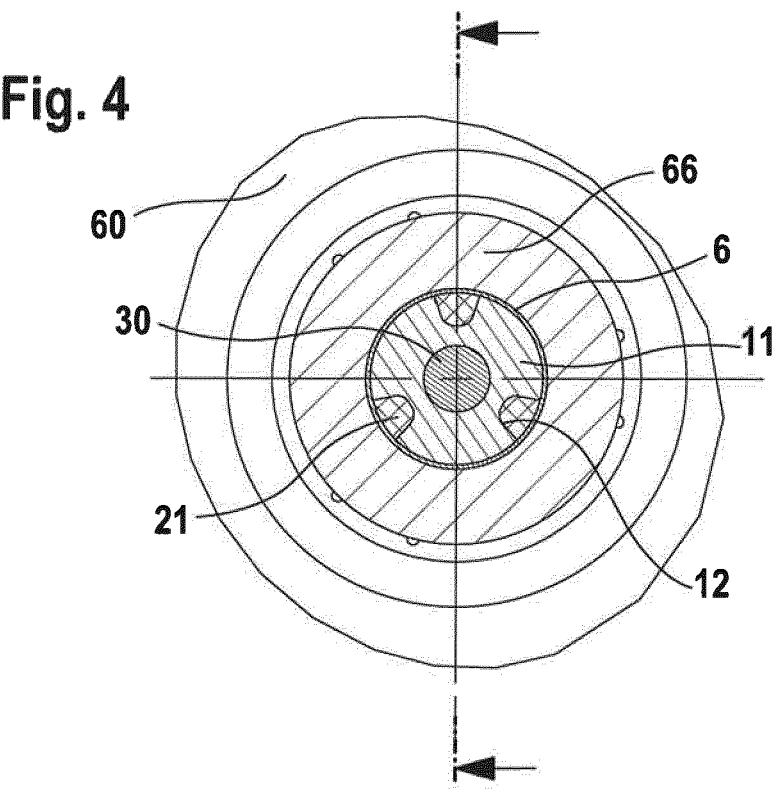
FIG. 4 shows a region of a cross-section of the sliding bearing having the sealing arrangement according to the second embodiment in the water pump.

A second embodiment of the sealed sliding bearing 1 will be described hereinafter with reference to FIGS. 3 and 4.

The second embodiment differs from the first embodiment by virtue of an increase in the size of the lubricant reservoir 20 in the axial direction. In the outer peripheral surface of the sliding bearing bushing 11, three grooves are introduced as recesses 12 from one end to the other end in the axial direction. The lubricant reservoir 20 has three axial extensions which are complementary thereto, consist of the porous substrate 21 and take up the spaces of the three axial recesses 12 and fill same with the lubricant. Optionally, the porous substrate 21 can extend on the dry side or drive side as far as the shaft seal 25 and can be in contact with a sealing lip thereof. Otherwise, the porous substrate 21 of the lubricant reservoir 20 can terminate at any axial extension of the recesses 12 and the volume of a remaining space as far as the shaft seal 25 is taken up by a lubricant filling 22 without the porous substrate 21. The recesses 12 permit contact over a large surface between the lubricant and the porous sintering material of the sliding bearing bushing 11. Furthermore, the recesses 12 establish a liquid connection between the two shaft seals 24 and 25 outside the bearing gap.

Fixing rings 15 are arranged between the sliding bearing bushing 11 and the shaft seals 24 and 25 in order to provide a circumferential bearing surface on the end side of the sliding bearing bushing 11 for the shaft seals 24 and 25 also in the region of the recesses 12.

It is understood that alternatively the number and the shape of the recesses 12 can be varied between the two axial ends of the sliding bearing bushing 11. Likewise, a spiral shape, a labyrinth or other structure of one or a plurality of recesses 12 can be provided. A recess 12 can likewise be provided through a peripheral thickness of the sliding bearing bushing 11.

The porous substrate 21 can likewise have a core region without open pores or can be fixed in the core region of the lubricant reservoir 20 by means of a different material portion.

LIST OF REFERENCE NUMERALS 1 sliding bearing
2 sealing arrangement
3 shaft
4 wet side
5 dry side
6 bearing housing
10 water pump
11 sliding bearing bushing
12 recess
14 clamping ring
15 fixing ring
20 lubricant reservoir
21 porous substrate
22 lubricant filling
24 wet-side shaft seal
25 dry-side shaft seal 30 pump shaft
40 pump chamber
41 pump impeller
50 drive side
51 electric motor
52 stator
53 rotor
60 pump housing
61 intake connection
62 pressure connection
63 thrust surface
64 spiral housing
65 motor cover
66 bearing seat

The invention claimed is:

1. A sliding bearing having a sealing arrangement, for use in a water pump, configured for a radial mounting and sealing of a shaft in a housing between a wet side and a dry side, comprising:
 a sliding bearing bushing made of a sintering material for the radial mounting of the shaft, and
 a dry-side shaft seal arranged between the sliding bearing bushing and the dry side;
 a wet-side shaft seal arranged between the wet side and the sliding bearing bushing; and
 a lubricant reservoir with a substrate, made of a non-sintered material, which is porous in at least some sections, arranged at least between the wet-side shaft seal and the sliding bearing bushing; wherein
 the lubricant reservoir includes, in pores of the substrate, a lubricant insoluble in water, and a volume of the lubricant reservoir and a volume of a lubricant filling take up a total volume of spaces between the wet-side shaft seal and the dry-side shaft seal.

2. The sliding bearing having the sealing arrangement according to claim 1, wherein
 the volume of the substrate is entirely formed of a structure with open pores, and the open pores are saturated with the lubricant.

3. The sliding bearing having the sealing arrangement according to claim 1, wherein
 the substrate is made of a polymer matrix with a defined porosity.

4. The sliding bearing having the sealing arrangement according to claim 1, wherein
 the lubricant is an oil.

5. The sliding bearing having the sealing arrangement according to claim 1, wherein
 the sintering material of the sliding bearing bushing has a defined porosity.

6. The sliding bearing having the sealing arrangement according to claim 1, wherein
 in the sliding bearing bushing at least one recess is formed that extends through an axial dimension of the sliding bearing bushing, and the lubricant reservoir and the lubricant filling take up a volume of the at least one recess.

7. The sliding bearing having the sealing arrangement according to claim 6, wherein
 a plurality of axial recesses are formed in an outer circumference of the sliding bearing bushing.

8. The sliding bearing having the sealing arrangement according to claim 6, wherein
 the porous substrate of the lubricant reservoir extends through the at least one recess and is in contact with the dry-side shaft seal.

9. The sliding bearing having the sealing arrangement according to claim 1, wherein
 a sealing lip of the dry-side shaft seal is inclined towards the sliding bearing bushing.

10. The sliding bearing having the sealing arrangement according to claim 1, wherein
 the dry-side shaft seal is made of a fluororubber.

11. The sliding bearing having the sealing arrangement according to claim 10, wherein
 the fluororubber includes vinylidene (di)fluoride.

12. The sliding bearing having the sealing arrangement according to claim 1, wherein
 the wet-side shaft seal is made of polytetrafluorethylene.

13. The sliding bearing having the sealing arrangement according to claim 1, wherein
 a radial sliding bearing gap is from 3 to 10 μm.

14. The sliding bearing having the sealing arrangement according to claim 1, wherein
 the sliding bearing bushing, the shaft seals, and the lubricant reservoir are accommodated inside a cylindrical bearing housing.

15. A water pump for a coolant circuit in a vehicle, comprising the sliding bearing having the sealing arrangement according to claim 1, wherein
 the sliding bearing having the sealing arrangement is arranged inside a pump housing between a pump chamber, in which a pump shaft is connected with a pump impeller, and a drive side of the pump housing, on which the pump shaft is driven.

16. The water pump according to claim 15, further comprising an electric motor of the dry-runner type which is connected to the pump shaft.

17. The water pump according to claim 15, wherein the pump housing comprises a thrust surface that is opposite to an end of the pump shaft to the sliding bearing.

18. The water pump according to claim 15, wherein
 the volume of the substrate is entirely formed of a structure with open pores, and the open pores are saturated with the lubricant.

19. The water pump according to claim 15, wherein
 the substrate is made of a polymer matrix with a defined porosity.

20. The water pump according to claim 15, wherein
 the lubricant is an oil.

* * * * *